United States Patent [19]

Nishimura et al.

[11] Patent Number: 4,733,922
[45] Date of Patent: Mar. 29, 1988

[54] VALVE ASSEMBLY FOR BRAKE FLUID PRESSURE CONTROL

[75] Inventors: Takumi Nishimura, Chiryu; Tadao Saito, Nagoya; Nobuyasu Nakanishi; Noboru Noguchi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 870,520

[22] Filed: Jun. 4, 1986

[30] Foreign Application Priority Data

Jun. 5, 1985 [JP] Japan .................. 60-084713[U]

[51] Int. Cl.$^4$ ............................. B60T 8/42
[52] U.S. Cl. ........................ 303/113; 303/115; 303/117
[58] Field of Search ............... 303/113, 115, 117, 119

[56] References Cited

U.S. PATENT DOCUMENTS

| | | | |
|---|---|---|---|
| 3,813,130 | 5/1974 | Inada | 303/21 F |
| 4,027,924 | 6/1977 | Kondo | 303/115 |
| 4,113,323 | 9/1978 | Haney | 303/115 |
| 4,116,495 | 9/1978 | Belart | 303/115 |
| 4,218,100 | 8/1980 | Kervogoret | 303/119 |

FOREIGN PATENT DOCUMENTS

| | | | |
|---|---|---|---|
| 3233313 | 3/1984 | Fed. Rep. of Germany | 303/115 |
| 58-199258 | 5/1982 | Japan . | |
| 1533774 | 11/1978 | United Kingdom | 303/115 |

*Primary Examiner*—Duane A. Reger
*Assistant Examiner*—Matthew C. Graham
*Attorney, Agent, or Firm*—Burns, Doane, Swecker & Mathis

[57] ABSTRACT

A brake fluid pressure control valve assembly includes a body having a single cylinder bore communicating inlet and outlet ports connected to a brake master cylinder and wheel brake cylinder, respectively. The cylinder bore accommodates the components of two separate valves, namely first, second and third seat members and first and second valve elements brought into and out of contact with seat surfaces of these seat members, as well as a spring interposed between the two valve elements, a pressure reducing piston and a by-pass piston. First and second passageways arranged in parallel each interconnect the inlet and outlet ports through two serially arranged valve cavities in the cylinder bore and are opened and closed in a prescribed manner by the two valves in cooperation with the spring and pistons. The third seat member has seal rings fitted in first and second annular grooves formed in its outer periphery for providing a seal between the outer periphery of the third seat member and wall surfaces of axially extending bores in the first and second seat members. The outer diameter of the third seat member is smaller than the inner diameter of the first and second seat members so that the inner peripheral portions of the these seat members will not be contacted by the third seat member. The first and second seat members are joined to each other by a pin press fitted into opposing holes formed in opposing end faces of these seat members.

3 Claims, 2 Drawing Figures

VALVE ASSEMBLY FOR BRAKE FLUID PRESSURE CONTROL

BACKGROUND OF THE INVENTION

This invention relates to a valve assembly for brake fluid pressure control in an automotive vehicle and, more particularly, to a brake fluid pressure control valve assembly used in an anti-skid control apparatus.

As well-known in the art, an anti-skid control apparatus operates by sensing the premonitory symptoms of wheel lock-up when a brake is applied, interrupting hydraulic pressure by a cut-off valve, which is arranged between the brake master cylinder and wheel brake cylinder, upon detection of such symptoms, and increasing the volume of a hydraulic circuit on the wheel brake cylinder side to reduce the brake fluid pressure of the wheel brake cylinder, thereby causing a decline in wheel braking force. When the tendency of the wheels to lock has thus been mitigated, the apparatus decreases the volume of the hydraulic circuit on the wheel brake cylinder side to raise the brake fluid pressure, thereby increasing the wheel braking force.

In an anti-skid control apparatus of this kind, there is the danger that the cut-off valve will close accidentally due to a failure in the valve opening mechanism, as a result of which brake fluid pressure would be incapable of being applied from the brake master cylinder to the wheel brake cylinder, thereby making braking impossible. An arrangement for alleviating this danger has been proposed in, for example, the specification of Japanese Patent Application Laid-Open No. 58-199258, in which a by-pass valve which opens in response to a failure in the cut-off valve opening mechanism is arranged in parallel with the cut-off valve.

SUMMARY OF THE INVENTION

Discussion of the Problems in Prior Art

The arrangement disclosed in the above-cited specification includes a body having an inlet port connected with the brake master cylinder and an outlet port connected with the wheel brake cylinder. The body is provided with a parallel arrangement of first and second cylinder bores respectively communicating with the inlet and outlet ports. Incorporated in one of the cylinder bores is the cut-off valve and a pressure reducing piston for opening and closing the cut-off valve, and incorporated in the other cylinder bore is the by-pass valve and a by-pass piston for opening and closing the by-pass valve. With this arrangement, it is necessary that the body be provided with the two cylinder bores and with passageways for connecting the cylinder bores. It is also required that the cut-off valve components, namely a seat member, valve body and spring, as well as the pressure reducing piston, be incorporated in one of the cylinder bores and that the bore be closed by a closure member. Likewise, it is required that the by-pass valve components, namely a pair of seat members, a valve element and spring, as well as the by-pass piston, be incorporated in the other cylinder bore and that this bore also be closed by a closure member. The unfortunate result is not only a body which is large in size but also poor productivity stemming from the many man-hours required for machining and assembly.

Accordingly, an object of the present invention is to provide a brake fluid pressure control valve assembly which solves the aforementioned problems encountered in the prior art.

Another object of the present invention is to provide a brake fluid pressure control valve assembly of far fewer component parts, easier assembly and reliable sealing between components.

According to the present invention, the foregoing objects are attained by incorporating two valves, which are equivalent to the abovementioned cut-off valve and by-pass valve, in only a single cylinder bore formed in a body, namely, by providing a brake fluid pressure control valve assembly comprising:

a body having an inlet port connected to the brake master cylinder, an outlet port connected to the wheel brake cylinder, and a cylinder bore communicating the inlet and outlet ports;

a first seat member having an axially extending bore and a seat surface and fitted securely in the cylinder bore in sealed relation with respect to a wall surface of the cylinder bore;

a second seat member having an axially extending bore and a seat surface and fitted securely in the cylinder bore in sealed relation with respect to the wall surface of the cylinder bore and adjacent to said first seat member;

a third seat member having a seat surface, a first end portion fitted into the bore of said first seat member in sealed relation therewith and a second end portion fitted into the bore of said second seat member in sealed relation therewith for forming first and second valve chambers inside said first and second seat members, respectively;

first and second valve elements accommodated in said first and second valve chambers, respectively;

first and second passageway means arranged in parallel each for connecting the inlet port to the outlet port through the first and second valve chambers in seccession;

a spring for urging the first valve element to contact with the seat surface of said first seat member to cut off said first passageway means, and for urging the second valve element to separate from the seat surface of said third seat member to open said second passageway means and bring said second valve element into contact with the seat surface of said second seat member for cutting off said first passageway means;

a pressure reducing piston for separating the first valve body from the seat surface of said first seat member against said spring; and a by-pass piston for separating the second valve element from the seat surface of said second seat member and bringing said second valve element into contact with the seat surface of said third seat member against said spring;

said third seat member having an outer diameter smaller than an inner diameter of said first and second seat members and being provided with first and second annular grooves formed in its outer periphery and fitted with seal rings for providing a seal between the outer periphery of said third seat member and wall surfaces of the axially extending bores of said first and second seat members, respectively;

first and second passages constituting said first passageway means being formed respectively in said first and second seat members, said first and second passages extending axially of said first and second seat members and being offset by equal distances from a central axis thereof;

said first and second seat members being further provided with respective first and second holes opposing each other at relative angular positions where said first and second passages communicate with each other;

said first and second seat members being joined to each other by a pin press fitted into said first and second holes.

Thus, the valve assembly of the present invention having the foregoing construction has a single cylinder bore accommodating the components of two valves, namely the first seat member, second seat member, third seat member, first valve element and second valve element, as well as the spring, pressure reducing piston and by-pass piston. This eliminates the need for a passageway formed in the body of the conventional valve assembly in order to connect the two cylinder bores. In addition, the body of the valve assembly of the present invention is smaller than that of the prior art, and only a single closure member is needed to close the opening of the single cylinder bore, thereby reducing the number of component parts and making assembly easier. In particular, since the components of the two valves are integrated by press fitting the pin into the holes provided in the first and second seat members, the assembly operation is greatly facilitated and the coaxial alignment of both the members are easily established upon assembling.

Though the foregoing advantages might be obtained by adopting a configuration in which the outer diameter of the third seat member be sized to be larger than the inner diameter of the first and second seat members and the third seat member be press fitted into axially extending bores formed in the first and second seat members, such a configuration would result in the inner circumferential surfaces of the first and second seat members being scratched by the third seat member at the stage of the assembly operation where the third seat member is press fitted into the first and second seat members. Since the seal rings fitted into the annular grooves of the third seat member would then slide on and remain in contact with these scratched surfaces when the device is in the assembled state, the end result would be a poor seal between the outer circumferential surface of the third seat member and the inner circumferential surfaces of the first and second seat members. In accordance with the present invention, however, the outer diameter of the third seat member is set to a value which will not allow the third seat member to contact the inner circumferential surfaces of the first and second seat members. At the step where the third seat member is press fitted into the first and second seat members, therefore, in the assembly process no scratches are formed on the inner circumferential surfaces of the first and second seat members on which the seal rings slide and where they are contacted by the seal rings when the device is in the assembled state. This assures that an improper seal will not occur.

Thus, according to the present invention as described hereinabove, there is provided a brake fluid pressure control valve assembly which, in comparison with the prior art, has a body of smaller size, fewer component parts and greater ease of assembly. Stillmore, there is also no risk of seal failure.

DESCRIPTION OF THE PREFERRED EMBODIMENT

Figure 1:
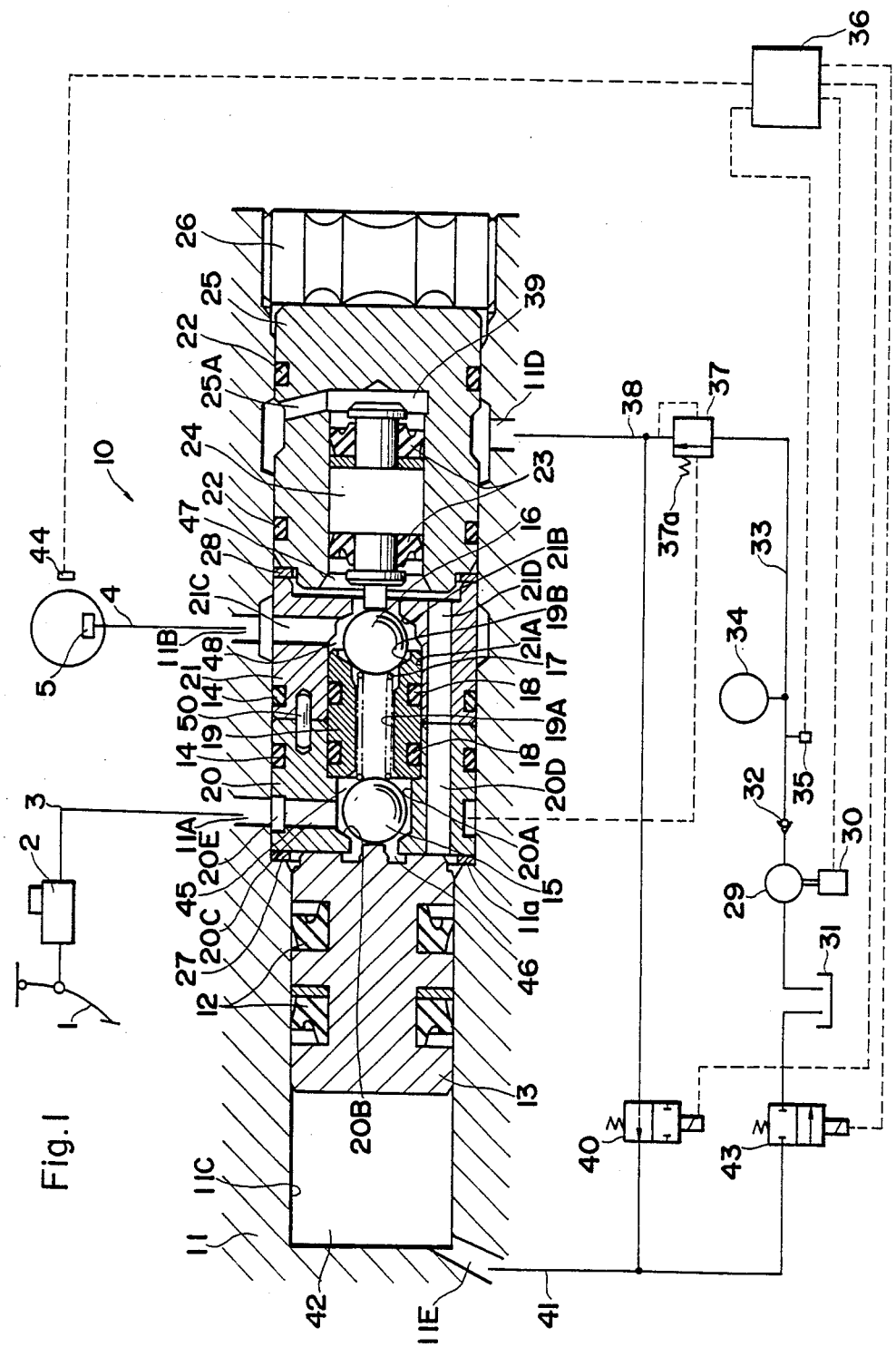
FIG. 1 is a view showing a system incorporating a preferred embodiment of a brake fluid pressure control valve according to the present invention.

A preferred embodiment of the present invention will now be described with reference to the drawings. FIG. 1 illustrates a system incorporating a brake fluid pressure control valve assembly in accordance with the present invention. The system includes a brake pedal 1 and a brake master cylinder 2 operatively associated therewith. Pressing down on the brake pedal 1 actuates the brake master cylinder 2, which responds by supplying a hydraulic circuit 3 with hydraulic pressure commensurate with the amount of foot pressure applied to the brake pedal 1. The hydraulic pressure in the hydraulic pressure circuit 3 is supplied to a wheel brake cylinder 5 by a hydraulic circuit 4 through a brake fluid pressure control valve assembly 10 in accordance with the present invention.

Figure 2:
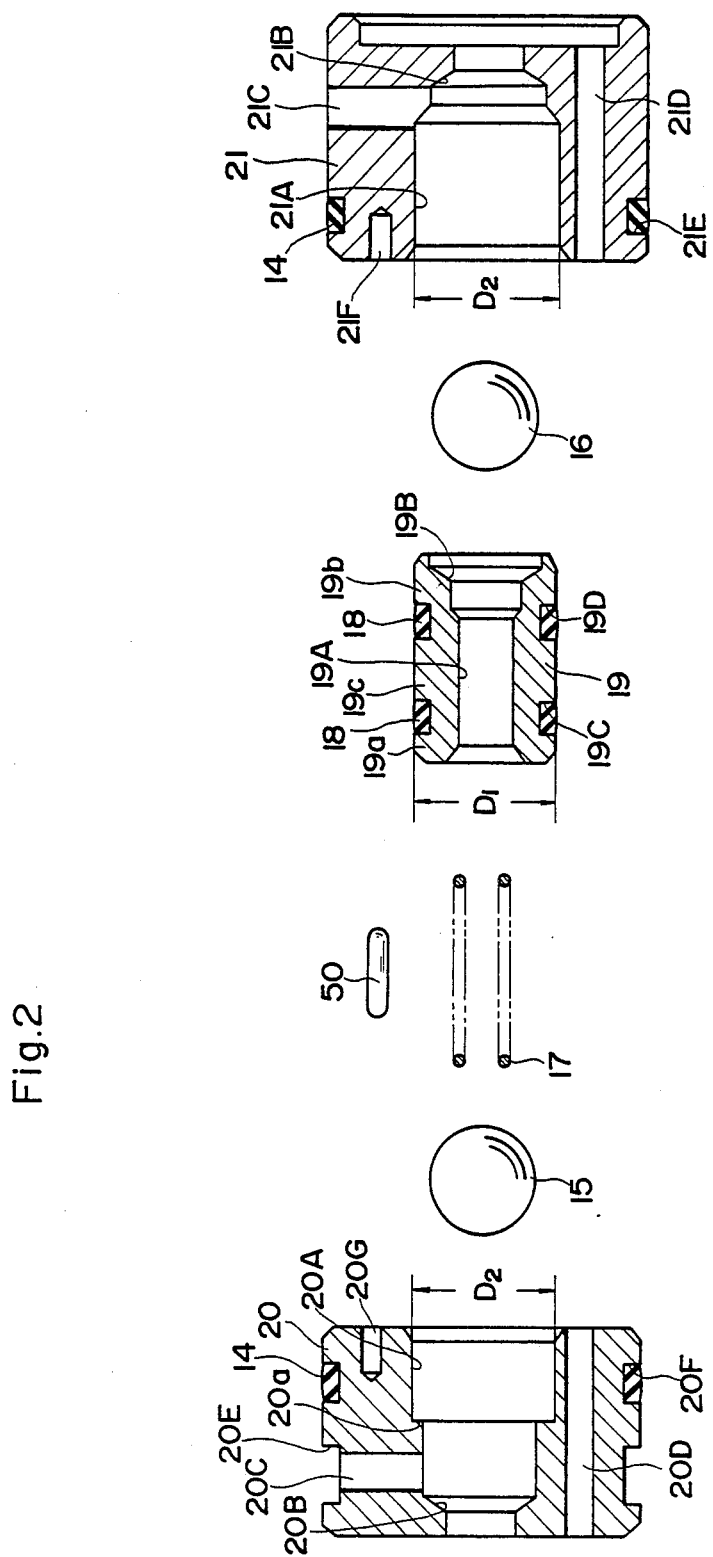
FIG. 2 is an exploded view, parts of which are shown in section, illustrating a principal partion of the valve assembly depicted in FIG. 1.

The valve assembly 10 has a body 11 which includes an inlet port 11A, an outlet port 11B and a cylinder bore 11C. A pressure reducing piston 13 equipped with ring-shaped cup seals 12 mounted in respective annular grooves formed in the outer periphery of the piston is fitted into the left end portion of cylinder bore 11C and is slidable along the inner wall surface of the bore while a tight seal is maintained between the inner wall surface and the piston by virtue of the seals 12. Fitted securely into the central portion of the cylinder bore 11C and maintained in tight sealing contact with its inner wall surface are first and second seat members 20, 21. Formed on the outer periphery of these first and second seat members 20, 21 are respective annular grooves 20F, 21E (FIG. 2) each fitted with a sealing ring 14. The first and second seat members 20, 21 interiorly accommodate first and second valve elements 15, 16, respectively, a spring 17 interposed between these valve elements, and a third seat member 19 having annular grooves 19C, 19D on its outer periphery. Fitted securely into the right end portion of the cylinder bore 11C and maintained in tight sealing contact with its inner wall surface is a closure member 25. Formed on the outer periphery of the closure member 25 are two annular grooves each fitted with a seal ring 22. A by-pass piston 24 fitted with two ring-shaped cup seals 23 is sealingly and slidably fitted into the closure member 25.

To secure the seat members 20, 21 and the closure member 25 against movement, the body 11 is provided with a step portion 11a and an annular member 26 is screwed into an opening at the extreme right end of the cylinder bore 11, thereby tightly securing the seat members 20, 21 and the closure member 25 in the cylinder bore 11 between the step portion 11a and the annular member 26, with gaskets 27, 28 being interposed between the step portion 11a and first seat member 20 and between the second seat member 21 and closure member 25, respectively.

The assembly comprising the seat members 19, 20, 21, the valve elements 15, 16, the spring 17 and the seal rings 14, 18 will now be described in greater detail.

The first seat member 20 has an axially extending bore 20A, a seat surface 20B, passages 20C, 20D, an annular groove 20E and a hole 20G. Likewise, the second seat member 21 has an axially extending bore 21A, a seat surface 21B, passages 21C, 21D and a hole 21F. The third seat member 19 has a passage 19A and a seat surface 19B. The third seat member 19 has an outer diameter $D_1$ set to be smaller than the inner diameter $D_2$ of the axial bores 20A, 21A of the first and second seat members 20, 21. To assemble these members, which are best seen in the exploded view of FIG. 2, the first step is to press fit a pin 50 into the hole 20G provided in the first seat member 20. Next, the first valve element 15 and the spring 17 are inserted into the axially extending bore 20A of first seat member 20. The left end of the third seat member 19 fitted with the seal rings 18 is then press fitted into the axially extending bore 20A until the left end face of the seat member abuts against the step portion 20a. This is followed by inserting the second valve element 16 into the axially extending bore 21A of second seat member 21. Then, with the hole 21F in the second seat member 21 aligned with the pin 50, the second seat member 21 is fitted onto the other end of the third seat member 19, in which state the second seat member 21 is forced leftward into abutting contact with the first seat member 20, whereby the pin 50 is press fitted into the hole 21F of the second seat member 21. In fitting the second seat member 21 onto the third seat member 19, a pin (not shown) serving as jig is passed through the passages 20D, 21D to bring them into proper linear registration and is withdrawn after assembly. Accordingly, the inner wall surfaces of the axially extending bores 20A, 21A in the seat members 20, 21 are maintained in a flaw-free condition and a reliable seal is obtained between the outer periphery of the third seat member 19 and the inner periphery of the first and second seat members 20, 21. Besides the pin 50 secures the angular and coaxial relationship of both the seat members 20 and 21.

The annular groove 20E, passage 20C, a valve chamber 45, pressure reducing chamber 46, passages 20D, 21D, a chamber 47, a valve chamber 48 and the passage 21C define a first passageway interconnecting the inlet port 11A and outlet port 11B. The annular groove 20E, passage 20C, the valve chamber 45, the passage 19A, the valve chamber 48 and the passage 21C define a second passageway.

In FIG. 1, a hydraulic pump 29 is actuated by a motor 30 to draw in a working fluid from a reservoir 31 and discharge the fluid into a hydraulic circuit 33 through a check valve 32. A pressure accumulator 34 and a pressure-sensitive switch 35 are connected to the hydraulic circuit 33. The pressure-sensitive switch 35 and motor 30 are connected to an electronic control unit 36. The latter responds to a signal from the pressure-sensitive switch 35 by operating the motor 30 in such a manner that hydraulic pressure internally of the pressure accumulator 34 resides within a prescribed range necessary for the operation of the valve assembly. Hydraulic pressure from the pressure accumulator 34 is supplied by the hydraulic circuit 33 to a hydraulic circuit 38 via a regulator valve 37. During non-application of the brake, the regulator valve 37 supplies the hydraulic circuit 38 with a hydraulic pressure set by a spring. When the brake is applied, the regulator valve 37 supplies the hydraulic circuit 38 with a hydraulic pressure proportional to and greater than a hydraulic pressure generated by the brake master cylinder 2. The hydraulic pressure in the hydraulic circuit 38 is supplied from a port 11D in body 11 to a chamber 39 on the right side of the by-pass piston 24 through a passageway 25A in the closure member 25. The hydraulic pressure causes the by-pass piston 24 to separate the second valve element 16 from the seat surface 21B and bring the valve element 16 into contact with the seat surface 19B. The hydraulic pressure in the hydraulic circuit 38 is also supplied from a port 11E in body 11 to a chamber 42 on the left side of the pressure reducing piston 13 through a normally-open solenoid valve 40 and a hydraulic circuit 41, thereby causing the pressure reducing piston 13 to separate the first valve element 15 from the seat surface 20B. The hydraulic circuit 41 is connected to the reservoir 31 through a normally-closed solenoid valve 43. The two solenoid valves 40, 43 are connected to the electronic control unit 36 which, when the brake is applied, controls the operation of the solenoid valves 40, 43 based on a signal from a wheel rotation sensor 44.

FIG. 1 shows the state of the valve assembly when the vehicle in traveling. Specifically, the pressure reducing piston 13 keeps the first valve element 15 separated from the seat surface 20B of the first seat member 20, and the by-pass piston 24 keeps the second valve body 16 separated from the seat surface 21B of the second seat member 21 and in contact with the seat surface 19B of the third seat member 19. Accordingly, when the driver steps down on the brake pedal 1 to stop the vehicle, the hydraulic pressure produced by the brake master cylinder 2 is fed into the wheel brake cylinder 5 through the hydraulic circuit 3, inlet port 11A, annular groove 20E, passage 20C, valve chamber 45, pressure reducing chamber 46, passage 20D, passage 21D, chamber 47, valve chamber 48, passage 21C, outlet port 11B and hydraulic circuit 4, whereby braking is applied to the wheels to brake the vehicle.

The rotating state of the wheels at braking is sensed by the sensor 44, which produces a corresponding signal applied to the electronic control unit 36. On the basis of this signal, the electronic control unit 36 checks for the premonitory symptoms of wheel locking and, when such symptoms are detected, closes the solenoid valve 40 and opens the solenoid valve 43. As a result, hydraulic pressure in chamber 42 on the left side of the pressure reducing piston 13 decreases so that the pressure reducing piston 13 is slid toward the chamber 42 by the hydraulic pressure in the pressure reducing chamber 46. At the beginning of the sliding stroke of pressure reducing piston 13, the first valve element 15 is brought into contact with the seat surface 20B by the spring 17 so that the hydraulic circuit on the wheel cylinder side extending from the pressure reducing chamber 46 to the wheel brake cylinder 5 is interrupted, after which the sliding of the pressure reducing piston 13 increases the volume of the hydraulic circuit on the oil brake cylinder side to lower the brake fluid pressure of the wheel brake cylinder 5, thereby decreasing the braking force acting on the wheels.

As a result of the foregoing operation, the rotational velocity of the wheels increases and is sensed by the sensor 44, which produces a corresponding signal. When the electronic control unit 36 detects on the basis of this signal that the danger of wheel locking no longer exists, the control unit restores the solenoid valves 40, 43 to their original states so that the chamber 42 on the left side of the pressure reducing piston 13 is again supplied with hydraulic pressure from the hydraulic circuit 38, whereby the piston 13 is slid back toward its original position to decrease the volume of the hydraulic circuit on the wheel brake cylinder side, thus elevating the brake fluid pressure in the wheel brake cylinder 5 to increase the braking force applied to the wheels. When the symptoms of wheel locking are not detected during the time that the pressure reducing piston 13 is returning to its original position, the piston 13 is allowed to return to the original position to separate the first valve element 15 from the seat surface 20B.

In the event that a prescribed hydraulic pressure is no longer supplied to the hydraulic circuit 38 owing to, say, failure of the hydraulic pressure pump 29, the second valve element 16 is forcibly separated from the seat surface 19B of the third seat member 19 and brought into contact with the seat surface 21B of the second seat member 21 by the spring 17. When the brake pedal 1 is depressed, therefore, the pressure reducing piston 13 is slid leftward by the hydraulic pressure from the brake master cylinder 2, thereby allowing the first valve element 15 to contact the seat surface 20B. Though hydraulic pressure now can no longer be supplied to the wheel brake cylinder 5 through the pressure reducing chamber 46, the action of the second valve element 16 permits hydraulic pressure from the brake master cylinder 2 to be fed into the wheel brake cylinder 5 through the valve chamber 45, passage 19A and valve chamber 48, as a result of which braking is applied to the wheels. Since the second valve element 16 is in contact with the seat surface 21B at this time to cut off the pressure reducing chamber 46 and the chamber 47 from the wheel brake cylinder 5, a phenomenon wherein the brake fluid flows into the pressure reducing chamber 46 and chamber 47 to increase the brake pedal stroke cannot occur.

As many apparently widely different embodiments of the present invention can be made without departing from the spirit and scope thereof, it is to be understood that the invention is not limited to the specific embodiments thereof except as defined in the appended claims. For example, through the two valve elements 15, 16 are urged by the single spring 17 in the illustrated embodiment, an arrangement can be adopted in which these valve elements are acted upon by separate springs. Further, in the illustrated embodiment, communication is established between the passages 20D, 21D by positioning these passages linearly when the seat members 19, 20, 21 are press fitted. However, it is possible for the passages 20D, 21D to be brought into communication by forming an annular groove in one of the opposing side faces of the seat members 20, 21, the radius of the annular groove being the distance from central axis of the seat members to the passages 20D, 21D. This will make it possible to delete the positioning step.

What is claimed is:

1. A valve assembly for brake fluid pressure control in a system having a brake master cylinder and a wheel brake cylinder, comprising:
    a body having an inlet port connected to the brake master cylinder, an outlet port connected to the wheel brake cylinder, and a cylinder bore communicating the inlet and outlet ports;
    a first seat member having an axially extending bore and a seat surface and fitted securely in the cylinder bore in sealed relation with respect to a wall surface of the cylinder bore;
    a second seat member having an axially extending bore and a seat surface and fitted securely in the cylinder bore in sealed relation with respect to the wall surface of the cylinder bore and adjacent to said first seat member;
    a third seat member having a seat surface, a first end portion fitted into the bore of said first seat member in sealed relation therewith and a second end portion fitted into the bore of said second seat member in sealed relation therewith for forming first and second valve chambers inside said first and second seat member, respectively;
    first and second valve elements accommodated in said first and second valve chambers, respectively;
    first and second passageway means arranged in parallel each for connecting the inlet port to the outlet port through the first and second valve chambers in secession;
    a spring for urging the first valve element to contact with the seat surface of said first seat member to cut off said first passageway means, and for urging the second valve element to separate from the seat surface of said third seat member to open said second passageway means and bring said second valve element into contact with the seat surface of said second seat member for cutting off said first passageway means;
    a pressure reducing piston for separating the first valve body from the seat surface of said first seat member against said spring; and
    a by-pass piston for separating the second valve element from the seat surface of said second seat member and bringing said second valve element into contact with the seat surface of said third seat member against said spring;
    said third seat member having an outer diameter smaller than an inner diameter of said first and second seat members and being provided with first and second annular grooves formed in its outer periphery and fitted with seal rings for providing a seal between the outer periphery of said third seat member and wall surfaces of the axially extending bores of said first and second seat members, respectively;
    first and second passages constituting said first passageway means being formed respectively in said first and second seat members, said first and second passages extending axially of said first and second seat members and being offset by equal distances from a central axis thereof;
    said first and second seat members being further provided with respective first and second holes opposing each other at relative angular positions when said first and second passages are in communication with each other;
    said first and second seat members being joined to each other by a pin press fitted into said first and second holes, said first, second and third seat members, said first and second valve elements and said spring constituting a unitary assembly by means of said pin.

2. The valve assembly as defined in claim 1, wherein said first and second valve seat members are coaxially aligned by means of said pin.

3. The valve assembly as defined in claim 1, wherein said first and second valve elements are balls.

* * * * *